Nov. 4, 1941.   L. McF. JONES   2,261,519
SEAT BED FOR AUTOMOBILES
Filed April 9, 1941   2 Sheets-Sheet 1
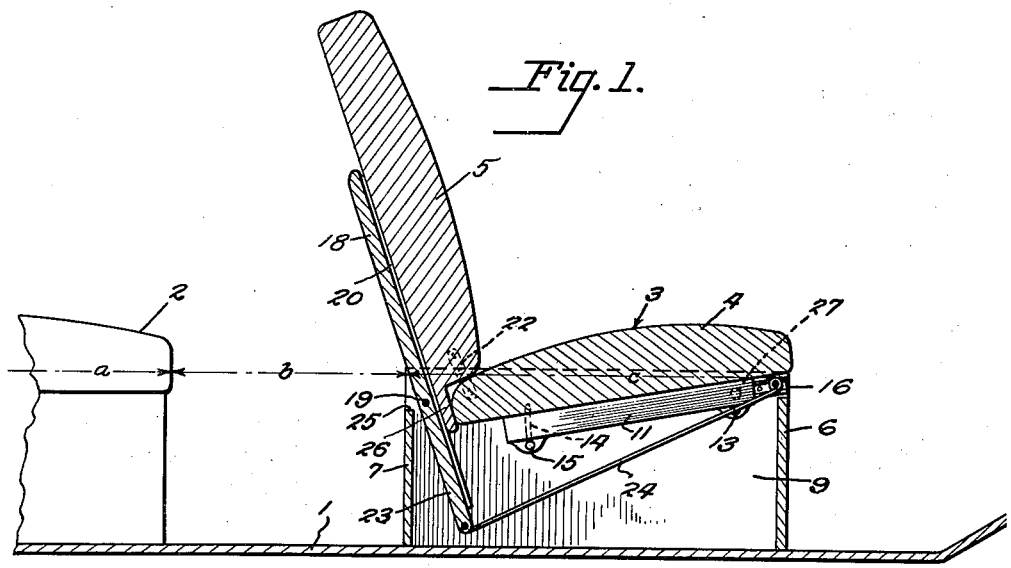
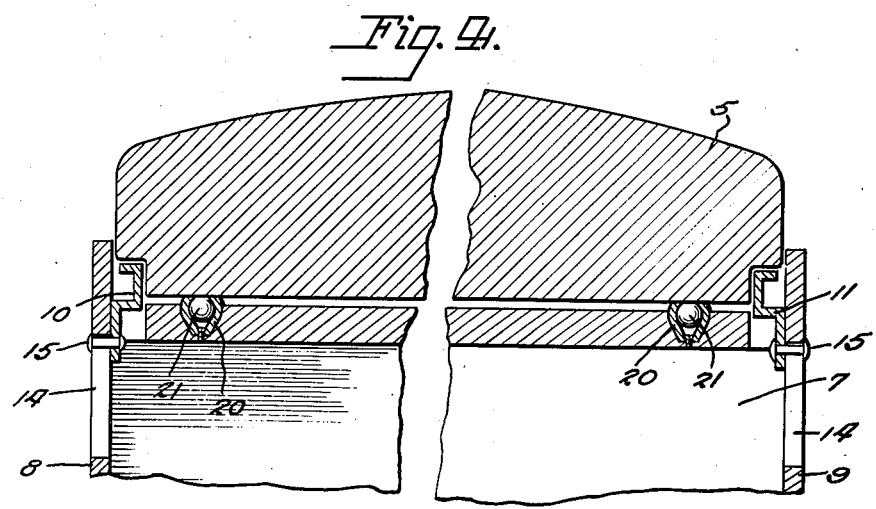
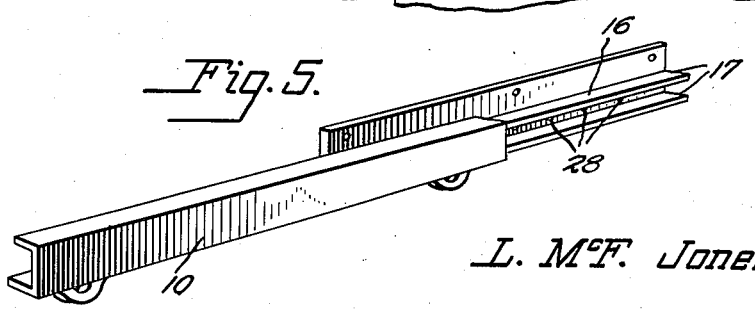
Inventor
L. McF. Jones
By Mason Fenwick & Lawrence
Attorneys Nov. 4, 1941.  L. McF. JONES  2,261,519
SEAT BED FOR AUTOMOBILES
Filed April 9, 1941  2 Sheets-Sheet 2
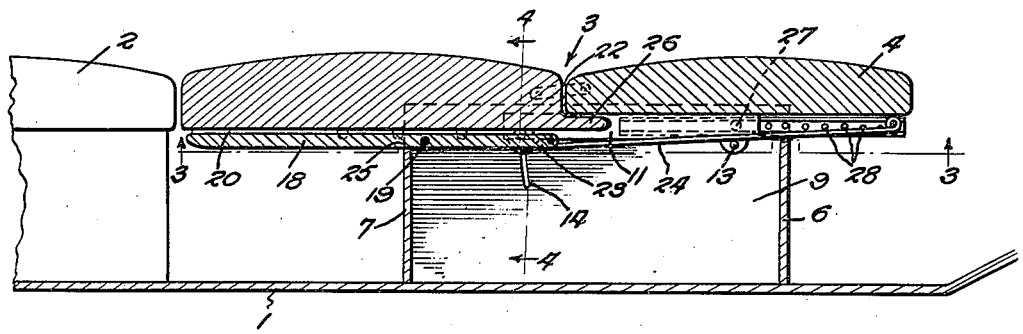
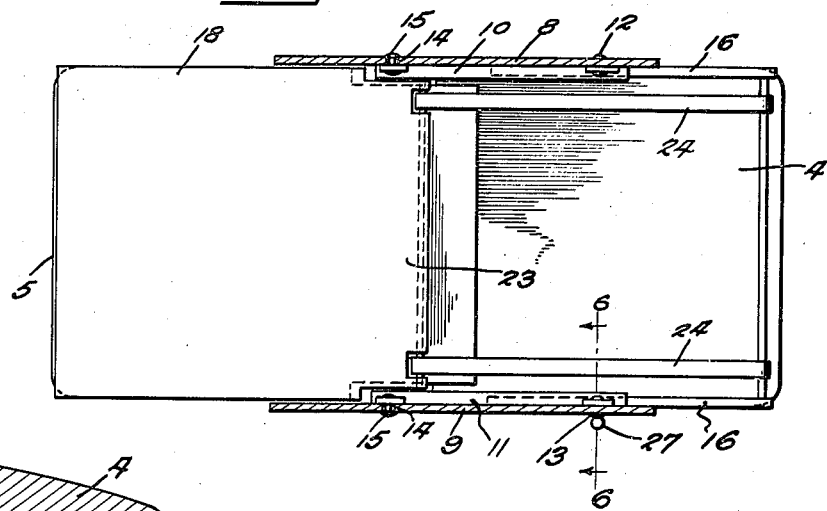
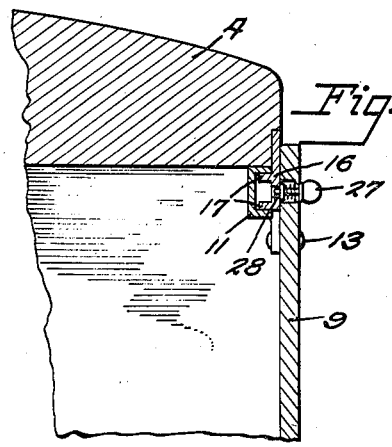
Inventor
L. McF. Jones Patented Nov. 4, 1941

2,261,519

UNITED STATES PATENT OFFICE 2,261,519

SEAT BED FOR AUTOMOBILES

Lucy McFarland Jones, Farmville, Va.

Application April 9, 1941, Serial No. 387,747

5 Claims. (Cl. 155—7)

One of the objects of the invention is to provide a collapsible front seat which when in horizontal position bridges the space between the rear and front seats of an automobile, lying on a level with the rear seat and cooperating therewith to form a full length bed.

In the average automobile body, the depth dimension of the rear seat plus the distance between the rear and front seats, plus the depth of the front seat, is less than the length of a full length bed so that one cannot make a practical full length bed simply by filling in the space between the front and back seats. One of the objects of the present invention is to secure the necessary room for a full length bed by moving the front seat bottom forward the necessary distance and making the backof the front seat with a height equal to the distance between the front edge of the back seat and the rear edge of the front seat bottom when the latter is in its forward position.

Another object of the present invention is to provide simple and effective means to cause the front seat bottom to move forward and draw the back of the front seat after it in a downward and forward direction as the seat back is tilted rearwardly.

Other objects of the invention will appear as the following description of a preferred and practical embodiment thereof proceeds.

In the drawings throughout the several figures of which the same characters of reference have been employed to designate identical parts:

Figure 1 is a vertical section through a collapsible seat embodying the principles of the subject invention, the same being shown in association with the appurtenant parts of an automobile body;

Figure 2 is a view similar to that of Figure 1, showing the seat in collapsed or bed-forming position;

Figure 3 is a section taken along the line 3—3 of Figure 2;

Figure 4 is a vertical section, the intermediate portion being broken away;

Figure 5 is a perspective view of the slide and guide connection between the seat bottom and the seat bottom support; and Figure 6 is a fragmentary vertical section taken along the line 6—6 of Figure 3.

Referring now in detail to the several figures, the numeral 1 represents the floor of an automobile body having the rear seat 2 and the front seat which in general is denoted by the reference character 3. As above stated, the distance $a$ representing the depth dimension of the rear seat plus the distance $b$ representing the distance between the front and rear seats, plus the distance $c$ representing the depth dimension of the front seat is less than the length of a full sized bed. The present invention provides that the front seat bottom 4 shall be moved forwardly to a point at such distance from the rear of the back seat as will equal the length of a full length bed. This necessitates that the back 5 of the front seat shall be of such height as to equal the distance that the front seat bottom 4 is moved forward plus the distance between the front and rear seats, so that the back 5 of the front seat shall substantially fill the space between the rear seat and the rear edge of the front seat bottom, as shown in Figure 2.

In Figures 1 and 4, the front seat is shown to be built upon a box-like base comprising the front and rear vertical members 6 and 7 and the opposite parallel vertical side members 8 and 9. At the forward end of this box-like base a pair of seat bottom supports 10 and 11 are hingedly mounted at the points 12 and 13 on a horizontal axis. Said seat bottom supports extend rearwardly and have a limit of swing determined by the length of arcuate slots 14 in which ride pins 15 secured adjacent the free ends of said seat bottom supports. Said seat bottom supports are preferably in the form of channeled members, as shown in Figure 5, acting as tracks or guides for the slide members 16 which are secured to opposite sides of the seat bottom 4 and have flanges 17 operating in the channels of said members 10 and whereby the seat bottom 4 is constrained at all times to move parallel to the seat bottom supports 10.

A swinging seat back support 18 is pivotally mounted at the intermediate point 19 in the side base members 8 and 9 on a horizontal axis substantially in a horizontal plane with the axis of the seat bottom supports and positioned rearwardly of the path of swing of said seat bottom supports so that both the seat bottom supports and seat back support may be swung into a common substantially horizontal plane. The length of the seat back support 18 above its pivotal axis 19 is less than the space between the front and back seat so that when in horizontal position said seat back support can clear the front edge of the rear seat.

There is a slide and guide connection between the seat back support 18 and the seat back 5, comprising channels 20 formed on one of said members and anti-friction slides such as the ball-like knobs 21 on the other of said members, retained within said channels so that the seat back support is constrained to move parallel to the surface of the seat back support 18. The seat bottom 3 and seat back 5 are closely interconnected by a coupling link 22 pivotally connected at its ends respectively with said back and bottom, permitting radial movement of either about the other.

The seat back support 18 has an integral extension 23 to the lower end of which one or more push rods 24 may be pivotally connected at one end and at their other end to the forward part of the seat bottom 4.

It will now be obvious that when the seat back support 18 is tilted rearwardly, the extension 23 will move forwardly, advancing the push rod 24 which moves the seat bottom 4 in a forward direction. The backward tilting of the seat back support 18 at the same time causes the seat back 5 to move downwardly parallel to said seat back support and the pivotal connection between the seat back 5 and the seat bottom 4 permits the seat back 5 to cam around the end of the seat bottom 4 as the latter begins to move out from under the seat back 5. As the seat bottom 4 moves forwardly it at the same time rises at its rear end, this movement being permitted by the freedom of the seat bottom supports 10 to swing upwardly. Thus, as the seat back 5 moves down to a horizontal position, the seat bottom 4 moves up to a horizontal position in the same plane.

When the seat back 5 has reached its horizontal position, further movement is stopped by the abutment of the seat back support 18 against the shoulder 25 on top of the base member 7, which shoulder is some distance away from pivotal axis 19. As the levers constituted by the seat back support 18 and the push rods 24 approach relative position of a straight angle, the seat back 5 which normally projects some distance above the seat back support 18 is drawn downwardly and forwardly by the seat bottom 4 to which it is attached, until when the parts are in horizontal position the seat back 5 falls into the position shown in Figure 3, substantially filling the space between the front edge of the rear seat 2 and the rear edge of the seat bottom 4 which latter member is now in its fully extended forward position.

While it is not essential to the operation of the invention, the seat back 5 is preferably provided at its lower edge with a flange 26, which normally lies directly behind the rear edge of the seat bottom 4, as shown in Figure 1, but which cams about the end of the seat bottom 4 so as to project beneath said seat bottom and to exert a lifting pressure thereupon as the parts assume horizontal position, and forming a rigid rest for the rear edge of the seat bottom 4 when the parts are in horizontal position, so that the freedom of the link 22 to swing is inhibited and the adjacent portions of the seat back and seat bottom are positively maintained against relative displacement in a vertical plane while the parts are in bed-forming position.

When the seat 3 is in its normal position shown in Figure 1, it is locked by means of a spring advanced bolt 27 accessible from the outside of the base which passes through a hole in one of the side members 8 or 9 and enters any one of a series of holes 28 formed in the slide member 16. Inasmuch as said slide member moves slightly arcuately with respect to the axis of the bolt, the holes 28 are made elongated in a vertical direction so as to ensure their registry with the bolt. By this means of adjustment the seat 3 can be set at any desired angle of inclination.

It will be understood by those skilled in the art that while I have in the foregoing description disclosed what I believe to be a preferred and practical embodiment of the invention, the specific details of construction and the arrangement of parts as shown and described are by way of example and not to be construed as limiting the scope of the invention as defined in the appended claims.

What I claim as my invention is:

1. Convertible seat-bed comprising a base, a swinging seat bottom support mounted at its forward end on said base on a horizontal axis, a swinging seat back support mounted at its lower portion on said base on a horizontal axis parallel to and substantially in a horizontal plane with the axis of said seat bottom support and positioned rearwardly of the path of swing of said seat bottom support so that both supports may be swung into a bed position in a common substantially horizontal plane, said supports having a normal seat position at a large angle to one another, a seat back and seat bottom, slide and guide means interconnecting said seat back and seat back support permitting said seat back to slide downwardly while restraining it to a path of movement parallel to said back support, means interconnecting said seat bottom and seat bottom support permitting said seat bottom to slide forwardly but restricting it to a path of movement parallel to said bottom support, an extension from said seat back support below its pivotal axis and swingable with said back support, a coupling between adjacent ends of said seat back and seat bottom pivotally connected at its ends respectively to said back and bottom, permitting radial movement of either about the other, and a push member pivotally connected to said extension and said seat bottom for drawing said seat bottom forward when said extension swings forwardly, whereby said seat back follows said seat bottom, in tandem, to bed position.

2. Convertible seat bed comprising a base member including opposite spaced parallel upstanding sides, a pair of swinging seat bottom supports pivotally secured at their forward ends to said sides along a common horizontal transverse axis, a swinging seat back support mounted at its lower portion on said base on a horizontal axis substantially in a horizontal plane with the axis of said seat bottom supports parallel thereto and positioned rearwardly of the path of swing of said seat bottom supports so that both said seat back support and said seat bottom supports may be swung into a bed position in a common substantially horizontal plane, said seat back support and said bottom supports having a normal seat position at a large angle to one another, a seat back and seat bottom, slide and guide means interconnecting said seat back and said seat back support permitting said seat back to slide downwardly while restraining it to a path of movement parallel to said seat back support, slide means on said seat bottom slidably engaging said seat bottom supports and interconnecting said seat bottom and seat bottom supports, permitting said seat bottom to slide forwardly but restricting it to a path of movement parallel to said seat bottom supports, an extension from said seat back support below its pivotal axis and swingable with said seat back support, a coupling between adjacent ends of said seat back and said seat bottom pivotally connected at its ends respectively to said seat back and seat bottom, permitting radial movement of either about the other, a push member pivotally connected to said extension and to said seat bottom for drawing said seat bottom forward when said extension swings forwardly whereby said seat back follows said seat bottom, in tandem to bed position, and pin and slot connections between said seat bottom supports and said side members limiting the swinging of said seat bottom supports.

3. Convertible seat bed as claimed in claim 1, said seat back having an extension at its lower end moving beneath the adjacent end of said seat bottom for maintaining the level relation of said seat back and seat bottom when they are in bed position.

4. Convertible seat bed as claimed in claim 2, including means for adjustably latching said seat bed in any of a number of selective seat-forming positions.

5. In a vehicle body having front and rear seats with a space between said seats, in which the normal distance from the rear of the rear seat to the front edge of the front seat is less than full bed length, a collapsible front seat comprising a swinging seat bottom support mounted at its forward end on a horizontal axis mounted transversely of the vehicle body, a swinging seat back support mounted at its lower portion on a horizontal axis parallel to and substantially in a horizontal plane with the axis of said seat bottom support and positioned rearwardly of the path of swing of said seat bottom support so that both supports may be swung into bed position in a common substantially horizontal plane, said supports having a normal seat position at a large angle to one another, said seat back support being of such length above its pivotal axis as to clear the front edge of said rear seat in moving to a horizontal plane, a seat back and seat bottom, slide and guide means interconnecting said seat back and seat back support permitting said seat back to slide downwardly while restraining it to a path of movement parallel to said seat back support, means interconnecting said seat bottom and seat bottom support permitting said seat bottom to slide forwardly by restricting it to a path of movement parallel to said seat bottom support, an extension from said seat back support below its pivotal axis and swingable with said back support, a coupling between adjacent ends of said seat back and seat bottom pivotally connected at its ends respectively to said back and bottom permitting radial movement of either about the other, a push member pivotally connected to said extension at a point spaced from the axis of said seat back support a distance equal to the determined forward movement of said seat bottom, said push rod being pivotally connected at its other end to said seat bottom for drawing the latter forward when said extension swings forwardly, whereby said seat back follows said seat bottom, in tandem, to bed position, said seat back being of such height as to fill the space between the front edge of said rear seat and the rear edge of said front seat bottom when the latter is in its foremost position.

LUCY McFARLAND JONES